US005301239A

United States Patent [19]

Toyama et al.

[11] Patent Number: 5,301,239

[45] Date of Patent: Apr. 5, 1994

[54] APPARATUS FOR MEASURING THE DYNAMIC STATE OF TRAFFIC

[75] Inventors: Masakazu Toyama, Tokyo; Nobuhiro Hamba, Yokohama, both of Japan

[73] Assignee: Matsushita Electric Industrial Co., Ltd., Kadoma, Japan

[21] Appl. No.: 829,390

[22] Filed: Feb. 3, 1992

[30] Foreign Application Priority Data

Feb. 18, 1991 [JP] Japan ........ 3-023157
Apr. 8, 1991 [JP] Japan ........ 3-075025
May 15, 1991 [JP] Japan ........ 3-110325

[51] Int. Cl.[5] ........ G08G 1/048; G06F 15/66

[52] U.S. Cl. ........ 382/1; 382/48; 382/50; 364/436; 340/937

[58] Field of Search ........ 382/1, 48, 18, 50; 340/937, 939, 942; 364/436–438, 424.01

[56] References Cited

U.S. PATENT DOCUMENTS 4,433,325 2/1984 Tanaka et al. ........ 340/933
4,847,772 7/1989 Michalopoulos et al. ........ 364/436
5,109,435 4/1992 Lo et al. ........ 382/48
5,150,426 9/1992 Banh et al. ........ 382/48
5,161,107 11/1992 Mayeaux et al. ........ 382/18

*Primary Examiner*—Leo H. Boudreau
*Assistant Examiner*—Larry J. Prikockis
*Attorney, Agent, or Firm*—Spencer, Frank & Schneider

[57] ABSTRACT

In an apparatus for measuring the dynamic state of traffic, a video camera unit picks up images of traffic on the road. The picture information is temporarily stored in memory units, and then processed by an image processing unit. The image processing unit controls the rate for updating background data determines whether it is daytime, dusk or night, and controls a threshold value for processing images. Further, the updating of the background data is made accurate and the extraction or identification of running vehicles is facilitated by employing a background differential system and a frame differential system. The output is transferred to a CPU to be utilized as a source of traffic information or for scheduling travelling time.

10 Claims, 13 Drawing Sheets

+ −Δ t sec

+ sec

BACKGROUND

FRAME DIFFERENTIAL

BACKGROUND DIFFERENTIAL

FRAME DIFFERENTIAL + BACKGROUND DIFFERENTIAL

APPARATUS FOR MEASURING THE DYNAMIC STATE OF TRAFFIC

BACKGROUND OF THE INVENTION

The present invention relates to an apparatus for measuring the dynamic state of traffic, and more particularly an apparatus installed at a road to collect necessary traffic information such as the speed of vehicles, the number of vehicles passing, the types of cars (ordinary cars, large cars), etc.

Conventionally, an apparatus for measuring the dynamic state of traffic has been structured such that it can process both current picture data, which is a picked up image of vehicles on the road, and background data of the road. The conventional apparatus can also calculate the speed of vehicles, the number of vehicles passing, the types of vehicles (ordinary cars, large cars), etc. based on the processed data, and output the results.

In the conventional apparatus stated above, however, there has been a problem: since the apparatus is installed outdoor, it is necessary to update background data to follow the weather changes, etc. When the background data is updated by obtaining the difference in luminance between an original image and a background image and multiplying the difference by a predetermined ratio, the background data can be brought into disorder because the updating is carried out even when the road is unseen due to traffic congestion or other reasons.

Further, according to the above-described conventional apparatus, there has also been a problem in that shadows of vehicles on the adjacent traffic lanes are misjudged as being vehicles when the picture is processed, or the shadow of the front portion of a vehicle is misjudged as being the front edge portion of the vehicle, thus causing an erroneous detection.

Further, there has also been a problem in that, when the luminance of the vehicle is decreased at dusk, it is hard to detect vehicles, not to mention those having a dark color with little difference of luminance from that of the road surface. Vehicles having bright color, with large differences of luminance are also hard to detect. Conventionally, it is impossible to eliminate all the unnecessary images of shadows even if image processing using only plus components is carried out. Here, the plus components are non-zero and non-negative components in the result of both the difference of background and the difference between frames, the former being the difference at each of the picture elements between the original image and the background image, while the latter is the difference at each of the picture elements between images taken at a time interval $\Delta t$. Therefore, an end edge portion of the shadow of vehicle may be detected as being a vehicle due to the difference between frames, resulting in a misjudgement and erroneous detection if the vehicle is running at high-speed or if it is a large car. Here, the difference between frames is the difference at each of the picture elements between original images taken at the time interval $\Delta t$.

Since image processings using only plus components are carried out, it is not possible to completely extract vehicle images from the normal processed screen pictures when there is small difference of luminance between black cars and the road surface on the video screen so that black cars may not be detected even in the daytime.

SUMMARY OF THE INVENTION

It is an object of the present invention to provide an apparatus for measuring the dynamic state of traffic which eliminates the above-described problems of the conventional art and which can accurately measure positions and speeds of vehicles by judging the state of the road (such as whether there are no vehicles, running vehicles, or standing vehicles on the road) and by maintaining always correct background data by changing the rate of updating the road data based on the judged state of the road.

(1) In order to achieve the above object, the apparatus for measuring the dynamic state of traffic according to the present invention includes a video camera unit for picking up the dynamic state of vehicles on the road and outputting picture data as electrical signals, an A/D converter connected to the video camera unit to convert the picture data from the video camera unit into digital data, an input image memory unit connected to the A/D converter to temporarily store the digital picture data, a background data memory unit connected to the A/D converter to store background data which becomes the background when an image of vehicles on the road is picked up, or road data when there is no vehicle on the road, an image processing unit connected to the input image memory unit and the background data memory unit, to compare road information stored in these memory units such as the background data obtained by the video camera unit, an average luminance value of the current picture data, a highest-frequency luminance value, and information about mobile objects, and to judge the presence or absence of vehicles on the road, the presence or absence of running vehicles, the presence or absence of standing vehicles and whether the running vehicles are large or small and an output unit connected to the image processing unit to output the result of the judgement.

Thus, according to the present invention, based on the current picture data and background data, it is possible to classify the states of the road into a state of no vehicle, a state of existing running vehicles and a state of existing standing vehicles. Further, in updating the background data, it is possible to update the background data using a large updating rate when there exists no vehicle based on the road information and a small updating rate when the road is congested with traffic. Thus, it is possible to maintain accurate background data and to measure positions and speed of vehicles.

(2) In order to achieve the above object, the vehicle dynamic state measuring unit of the present invention uses a video camera to pick up images of vehicles on the road, processes the picture data and measures and collects information about the dynamic state of the vehicles. When there exist shadows of the front surfaces of vehicles or shadows of vehicles on the adjacent lane in the daytime, the effect of the shadows is eliminated by using only the plus components of a background differential system or procedure and a frame differential system or procedure having expansion processing. Further, when there is little difference of luminance at dusk, the original picture data and background data are compared and a threshold value is selected in two stages in a picture element unit, and only the plus components of the background differential system and the frame differential system having expansion processing are used, to thereby eliminate the effect of the shadows. Here, the background differential system is a system in which the difference at each of the picture elements between the original image and background image is sought, the frame differential system is a system in which the difference at each of the picture elements between the original images taken at a time interval $\Delta t$, namely, a new image minus an old image is sought, and the expansion processing is treatment in which several picture elements on the upper scan lines (backward elements) with respect to the present picture element are treated as changed, if a change is found at the present picture element by the frame differential system.

Based on the above described configurations, the present invention has the following operations.

First, it is possible to trace and measure vehicles without having the influence of shadows of the front surface of the vehicles or shadows of running vehicles on the adjacent traffic lanes and thus measure and collect accurate traffic information. Second, it is possible to extract or identify vehicles of dark colors having little difference of luminance from the luminance of the road surface toward dusk, trace and measure these vehicles, to thereby collect accurate traffic information.

The present invention is characterized in that a decision is made whether a result of a frame differential processing having expansion processing is valid or not based on the result of background differential processing for each picture element.

The present invention is also characterized in that a processing screen is produced with different weights for the picture elements which have become valid in the background differential processing, the picture elements which have become valid in the frame differential processing with expansion processing, and the picture elements which have become valid in both processings.

According to the present invention, there are the following advantages. First, it is possible to eliminate the end edge portion of the shadow of a vehicle running on the adjacent traffic lane by judging whether the frame differential processing should be made valid or not based on the result of background differential processing in the unit of picture elements. Second, it is possible to accurately measure vehicles without having an influence by running vehicles on the adjacent traffic lane. Third, it is possible to produce a more accurate processing screen picture by changing the weight of the result of the processing based on the result of differentials for each picture element, so that vehicles of dark colors with little difference of luminance from the luminance of the road surface can be extracted. As a result, it is possible to accurately trace and measure vehicles to measure and collect accurate traffic information.

DESCRIPTION OF THE PREFERRED EMBODIMENTS

Figure 1:
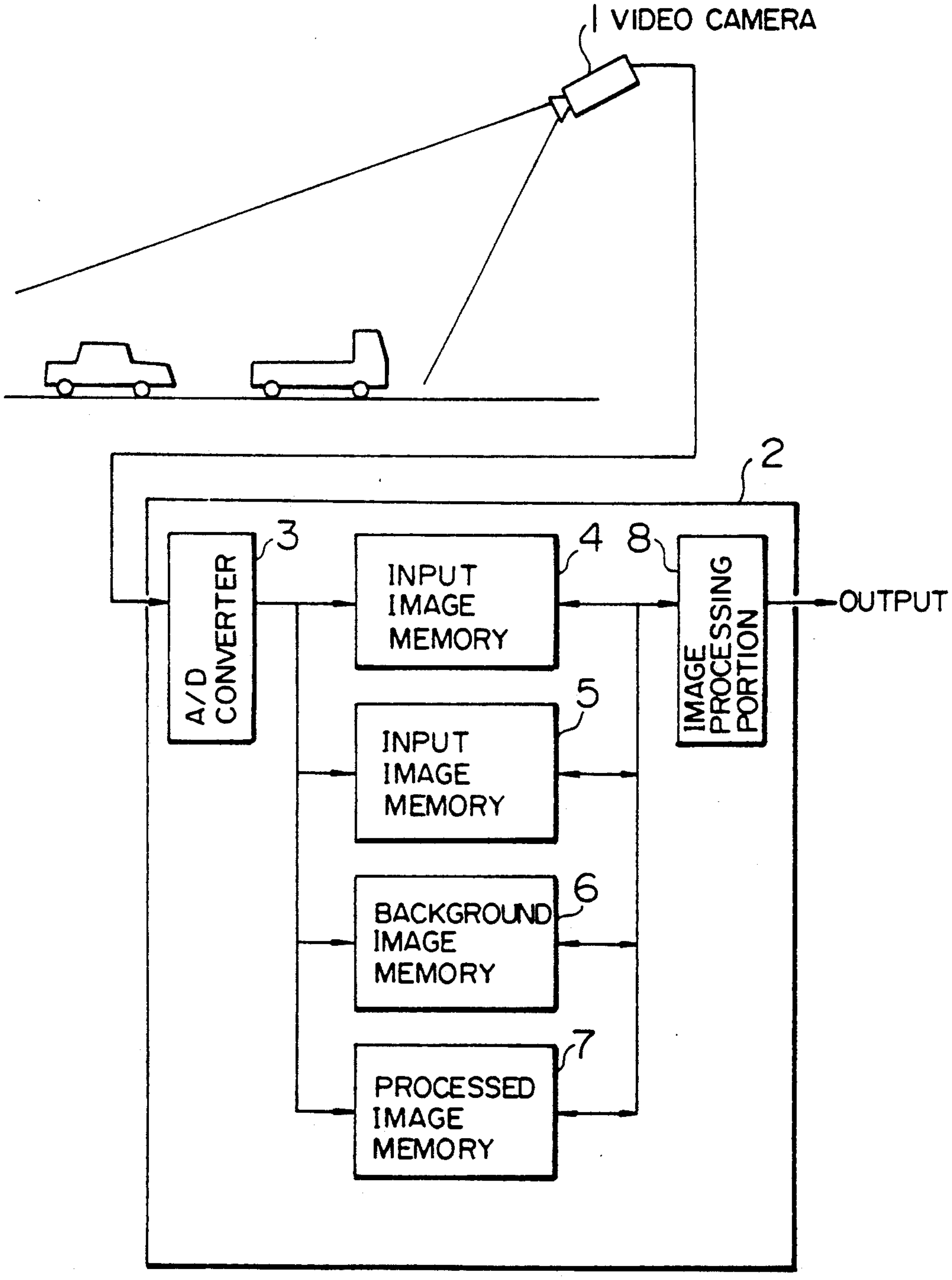
FIG. 1 is a block diagram showing the configuration of an apparatus for measuring the dynamic state of traffic according to a first embodiment of the present invention.

FIG. 1 is a block diagram showing the configuration of the vehicle dynamic state measuring unit according to one embodiment of the present invention.

In FIG. 1, 1 designates a video camera which is disposed to observe and pick up pictures of the movement of vehicles on the road and produce picture data in the form of electrical signals. Reference number 2 designates the main body of a traffic dynamic state measuring unit, connected to the video camera 1, to judge the state of the road based on information supplied from the video camera 1. The following are the configuration elements of the vehicle dynamic state measuring unit. Reference number 3 designates an A/D converter, connected to the video camera 1, to convert picture data outputted from the video camera 1 into digital data. Reference numbers 4 and 5 designate input image memories, connected to the A/D converter 3 to temporarily store input images of the digital data. Reference number 6 designates a background image memory, connected to the A/D converter 3, to temporarily store background data, which is road information in the state where no vehicles are present, picked up in an image by the video camera 1. Reference number 7 designates a processed image memory, connected to both the A/D converter 3 and an image processing unit to be described next, to temporarily store a processed image which is a result of processing an image in the image processing units. Reference number 8 designates the image processing portion, connected to the memories 4 to 7, to process images based on input images and a background image stored in the memories 4 to 6, extract and trace vehicles and evaluate the running speed of vehicles, judge the current state on the road and update the background data.

The operation of the above embodiment will be explained below.

First, picture information obtained by picking up images by using the camera 1 is sent to the main body of the traffic dynamic state measuring unit 2. The A/D converter 3 of the traffic dynamic state measuring unit 2 converts the picture information into digital data. Digital data of two screen pictures taken at a predetermined interval are temporarily stored in the input image memories 4 and 5. Then, information about the state of the road on which there exists no vehicle, or background data, is temporarily stored in the background image memory 6. This background data changes based on the time of day, such as morning, daytime or night, and the weather, such as fine, cloudy or rainy, so that the background data needs to be updated in accordance with these conditions in order to accurately depict the state of the road surface as shown in the prior-art example. The image processing portion 8 processes the data stored in input image memories 4 and 5 and the background image memory 6, writes the result of the processing in the processed image memory 7, and extracts or identifies vehicles from the picture data. By continuously carrying out these processings, the image processing portion 8 outputs the result of tracing of vehicles and the running speed of the vehicles, determines the current state of the road, and updates the background data based on this information.

The basic algorithm of the method for deciding the state of the road in the above embodiment will be explained below with reference to the drawings.

The state of the road which is divided into four stages, 0 to 3, as shown in Table 1.

[TABLE 1]

| State of the road | Flag of the state of the road surface |
|---|---|
| There exists no vehicle | 0 |
| There exist(s) running vehicle(s) (Small) | 1 |
| There exist(s) running vehicle(s) (Large) | 2 |
| There exist(s) stationary vehicle(s) | 3 |

Figure 2:
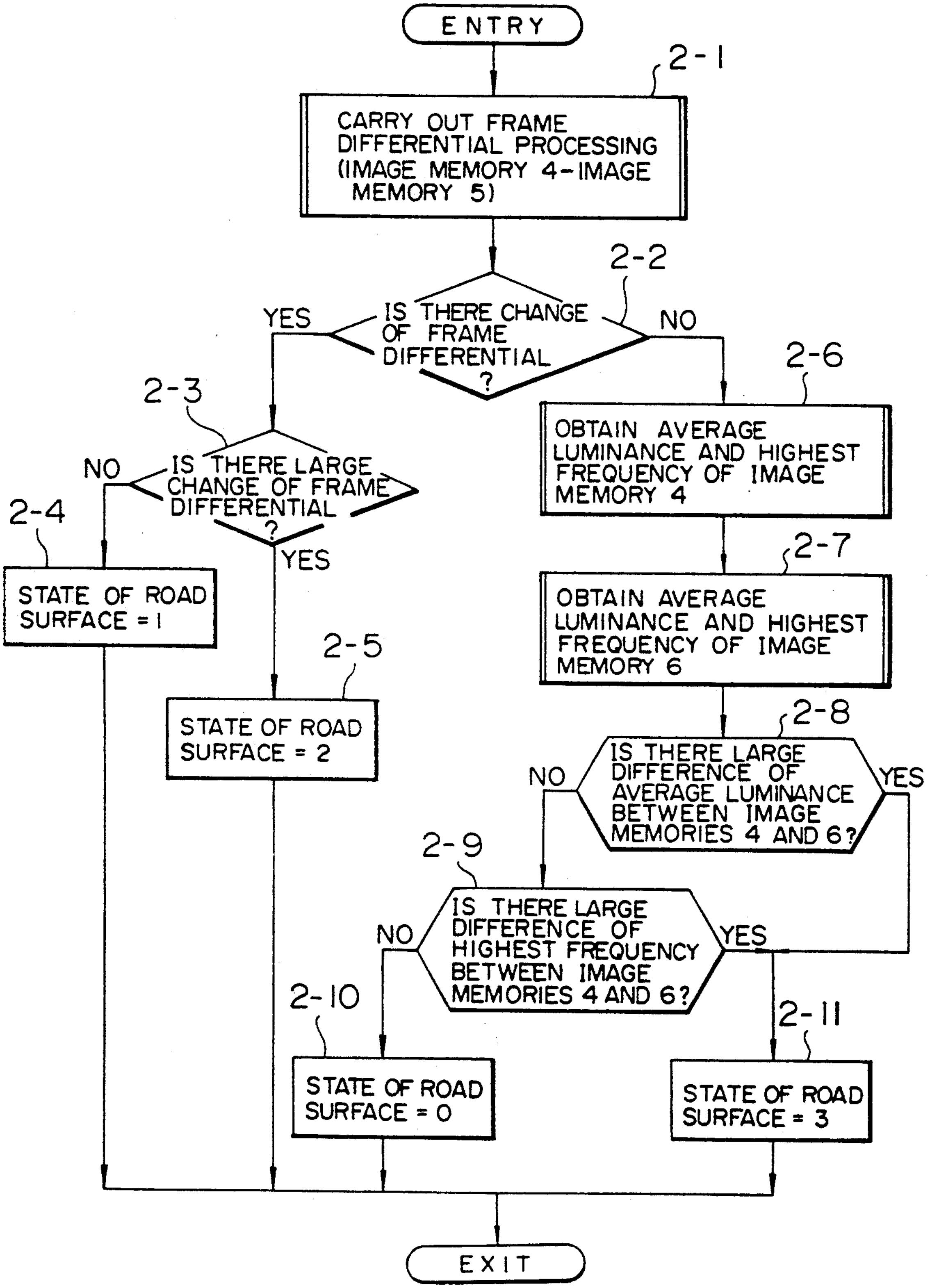
FIG. 2 is a flow chart showing the processing procedure of a method for judging the state of a road according to the first embodiment of the present invention.

First, referring to FIG. 2, in Step 2-1, a frame differential is taken between the input image memories 4 and 5 which store digital data of two screen pictures that have been picked up at a predetermined interval. By taking this frame differential, mobile objects (cars, in this case) can be extracted. In Step 2-2, by measuring the number of picture elements showing changes between the frames, it becomes possible to distinguish the states whether there exists a running car, whether there exists no cars, or whether there exists a standing car. In Steps 2-3, 2-4 and 2-5, a distinction between large and small running cars is made based on the number of picture elements showing changes between the frames. In Steps 2-6 and 2-7, an average luminance value and the most frequent value of the luminance in the input image memory 4 and the background image memory 6 are obtained to make a distinction between the presence and absence of stationary vehicles. In Steps 2-8 and 2-9, mutual average luminance values are compared, and when there is a large difference between these values, it is judged in Step 2-11 that a standing car exists. When the difference between the average luminance values is small and the difference between the most frequent values of the luminance is small, it is judged in Step 2-10 that no car exists. As described above, by comparing the most frequent values of the luminance, it is possible to determine whether a standing vehicle is present even when the average luminance value is small and a vehicle exists.

As described above, according to the above algorithm, the rate of updating the background data can be changed based on the state of the road surface (the state where no vehicle exists, the state where a running car exists, or the state where a standing vehicle exists). In other words, when no vehicle exists, the rate of updating the background data is taken to be large and when a standing vehicle exists, the rate of updating the background data is taken to be small so as to maintain more accurate background data.

Figure 3:
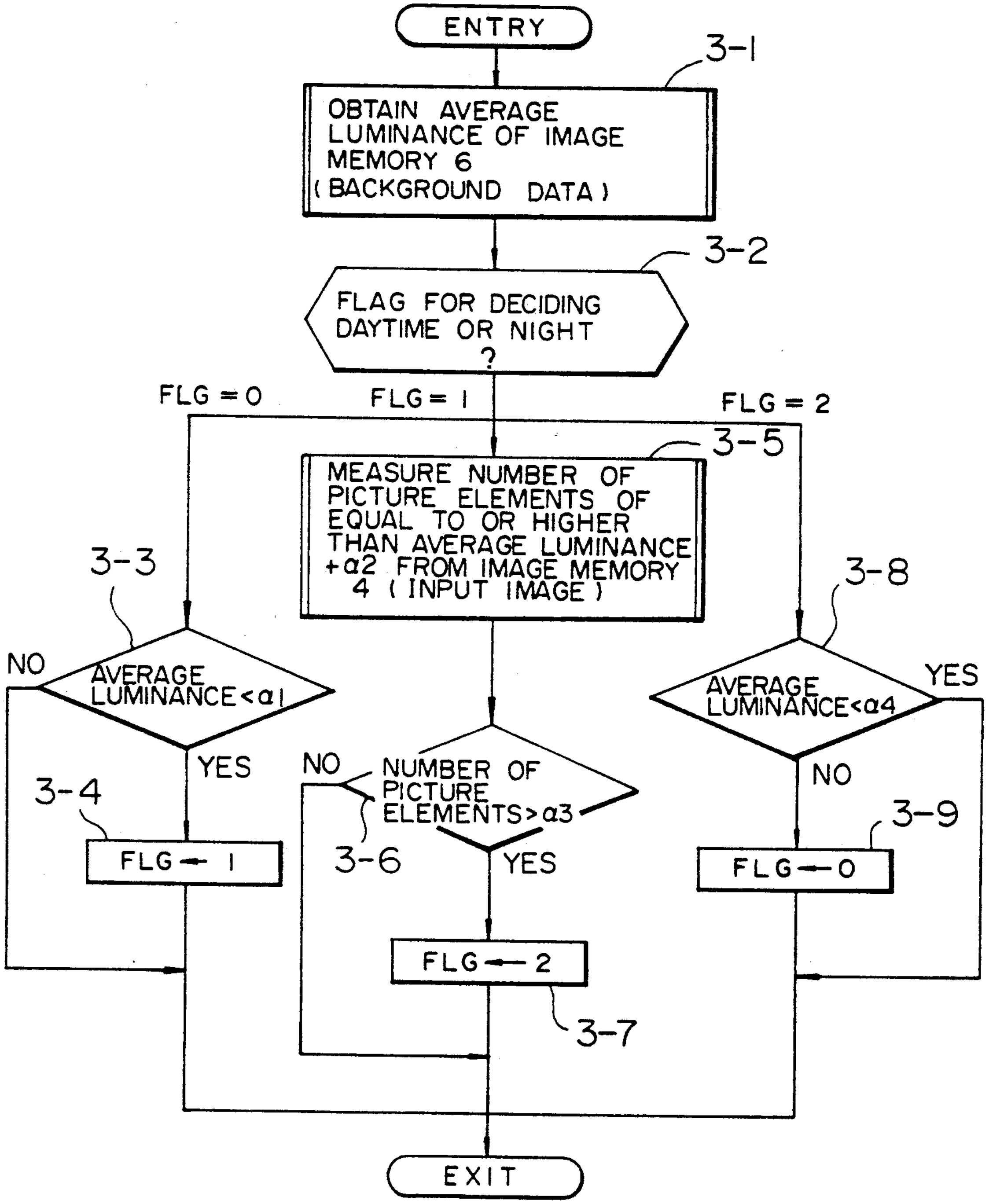
FIG. 3 is a flow chart showing the processing procedure of a method for judging daytime or night according to the first embodiment of the present invention.

The processing procedure for the method of judging daytime or night time according to the present invention will be explained below with reference to FIG. 3. In this case, as shown in Table 2, whether it is day or night can be judged in three stages, 0 to 2.

[TABLE 2]

| Environment | Flag for judging day or night |
|---|---|
| Daytime | 0 |
| Dusk time | 1 |
| Night time | 2 |

First, in Step 3-1, the average luminance of the background data in the background image memory 6 is obtained. Next, in Step 3-2, the flag for judging day or night is decided.

As shown in Table 2, when the flag for judging day or night is 0, it is daytime, when the flag is 1 it is dusk, and when the flag is 2 it is nighttime. When the flag is 0, or when it is daytime in Steps 3-3 and 3-4, the flag for the judgement is altered to the value for dusk if the average luminance of the background data is equal to or lower than a threshold value $\alpha 1$ as shown in FIG. 3, in which the threshold value $\alpha 1$ is used to judge whether the dusk flag should replace the daytime flag. When the flag for judgement is 1, or when it is dusk, in Steps 3-5, 3-6 and 3-7, the number of picture elements representative of headlights is measured from the data of the input image memory 4 by using a threshold value based on the average luminance of the background data, and the flag for the judgement is altered from the value for dusk to the value for night when the number is a threshold value $\alpha 3$ or above. As described above, according to the present embodiment, headlights are followed, and whether the processing should be shifted to a night trace processing or not is checked depending on the number of vehicles with their headlights on. Further, when the flag for judging day or night is 2, or when it is night, in Steps 3-8 and 3-9, the flag for the judgement is altered from the value for night to the value for the daytime if the average luminance value of the background data is a threshold value α4 or above.

As described above, according to the processing procedure for the method of judging day or night in the present invention, whether it is day, dusk or night is judged based on the background data so that a threshold value can be changed for the image processing. Particularly, when the environment is judged to be dusk and when there is little difference in the luminance between a car and the road surface in the current picture data, the threshold value in the image processing can be changed to a small value based on this information. At night, the background data is basically stable. However, the road surface may be sometimes be bright with the reflection of light from the headlights of a car when it passes, and this may influence the updating of the background data. Accordingly, when a judgement has been made that the environment is night based on the information for judging day or night, an accurate updating of the background data can be done by lowering the rate of updating the background data.

Figure 4:
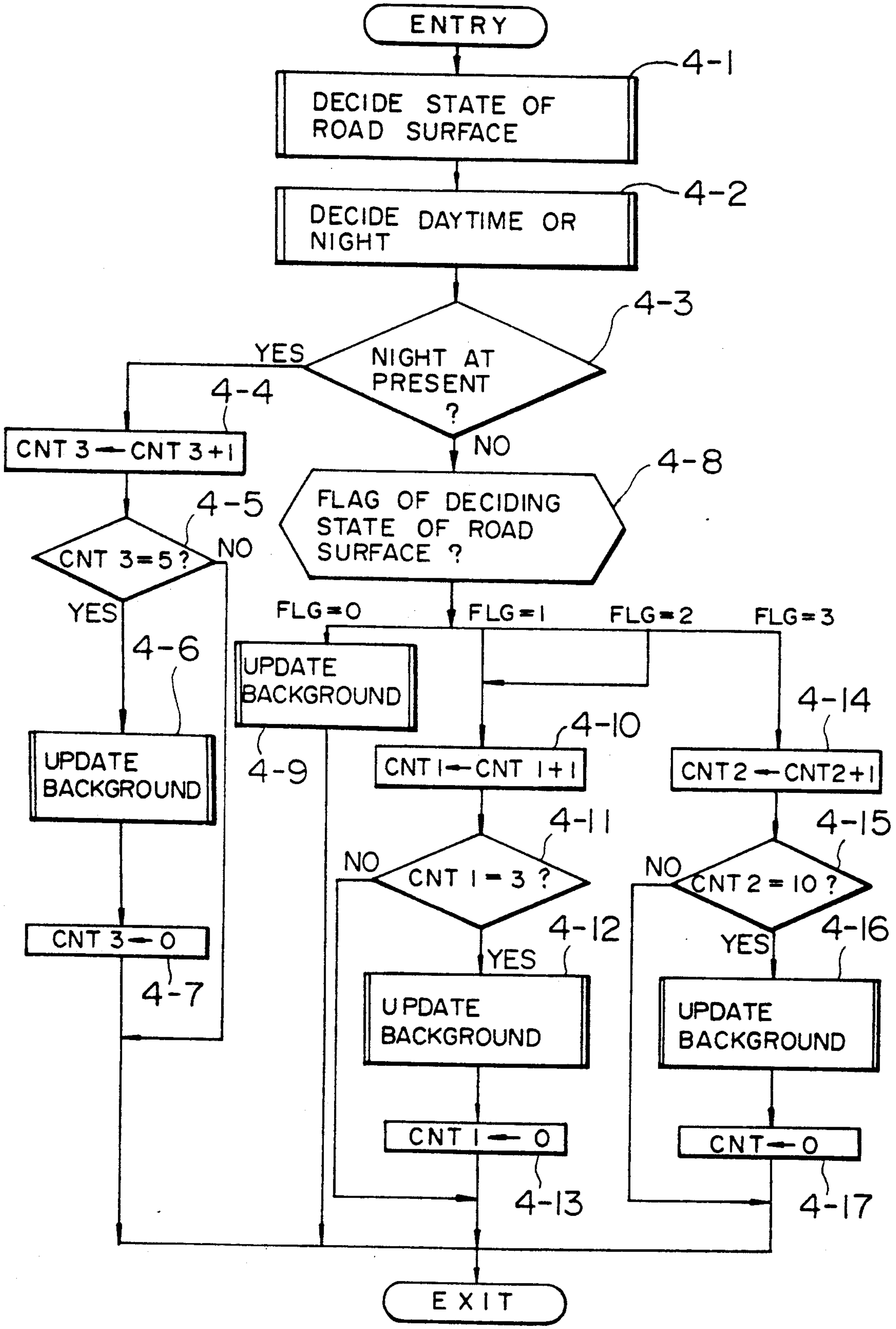
FIG. 4 is a flow chart showing the processing procedure of a method for updating the background according to the first embodiment of the present invention.

The processing procedure for the method of updating the background data according to the present invention will be explained below with reference to FIG. 4. First, in Steps 4-1 and 4-2, the state of the road and whether it is day or night are judged by a subroutine for judging the state of the road and a subroutine for judging day or night. In Steps 4-3, 4-4, 4-5, 4-6 and 4-7, when the current state is night, the background data is updated at the rate of once per five occasions. In FIG. 4, CNT designates a count number for updating. In the case of day, the rate of updating the background data is changed based on the state of the road. In other words, in Steps 4-8 and 4-9, when the flag for the state of the road shown in Table 1 is 0 (or when no car exists), the background data is always updated. In Steps 4-10 to 4-13, when the flag for the state of the road surface is 1 or 2 (or when a running car exists), the background data is updated once per three occasions. Further, in Steps 4-14 to 4-17, when the flag for the state of the road surface is 3 (or when a standing car exists), the background data is updated once per ten occasions.

As described above, according to the method for updating the background data of the present invention, based on the road information obtained by the method for judging the state of the road the background data can be prevented from becoming disordered by lowering the rate of updating the background data when there are standing cars due to traffic congestion. When no car exists, the background data can sufficiently follow rapid changes of environment conditions by increasing the rate of updating the background data. Further, by changing the rate of updating the background data depending on whether it is day or night, the influence of the reflections of light from the headlights on the road surface can be minimized at night.

Figure 5:
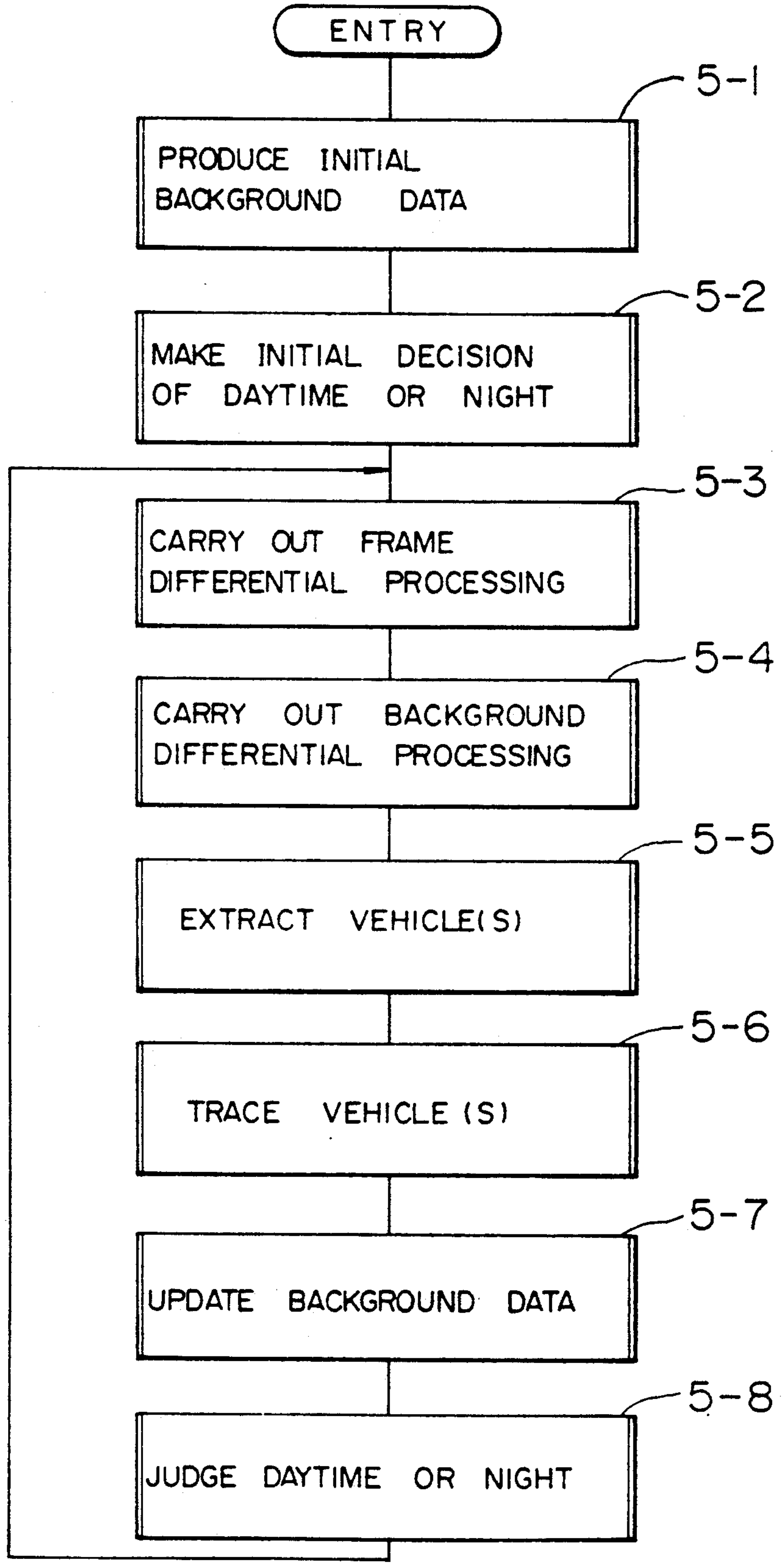
FIG. 5 is a flow chart showing the processing procedure for obtaining the dynamic state of vehicles based on a background differential system and a frame differential system according to the first embodiment of the present invention.

Next, the processing procedure for obtaining the dynamic state of traffic by using a background differential method and a frame differential method in accordance with the present invention will be explained with reference to FIG. 5.

First, in Step 5-1, initial background data is produced and stored in the background image memory 6. In Step 5-2, an initial processing for judging whether it is day or night is carried out. In Step 5-3, the frame differential processing is carried out, and in Step 5-4 the background differential processing is carried out and the processed data is stored in the processed image memory 7. The threshold values for these processings are changed depending on whether it is day, dusk or night. Particularly, when the environment is judged to dusk and there is little difference in luminance between the vehicles and the road surface small, a small threshold value can be used and the extraction of vehicle data in Step 5-5 can be facilitated. In Step 5-5, the luminance distribution in the horizontal direction is obtained from the processed data, to thereby extract a candidate for a vehicle. Here, the candidate for a vehicle is an image of a vehicle extracted as the result of the treatment including the difference between frames and the difference from the background. In Step 5-6, the result of this processing and the previous position of the candidate for a vehicle are compared, to measure a the movement of the vehicle. From the result of this measurement, the speed of the vehicle is determined. In Step 5-7, the background data is updated, and in step 5-8 a judgement of day or night is made.

As described above, according to the above processing procedure, the background data can be updated accurately based on the information of the road. Further, the information of the background differential becomes accurate, so that extracting of the existing vehicles can be performed easily. By carrying out the frame differential processing, running vehicles also can be extracted easily.

Figure 6:
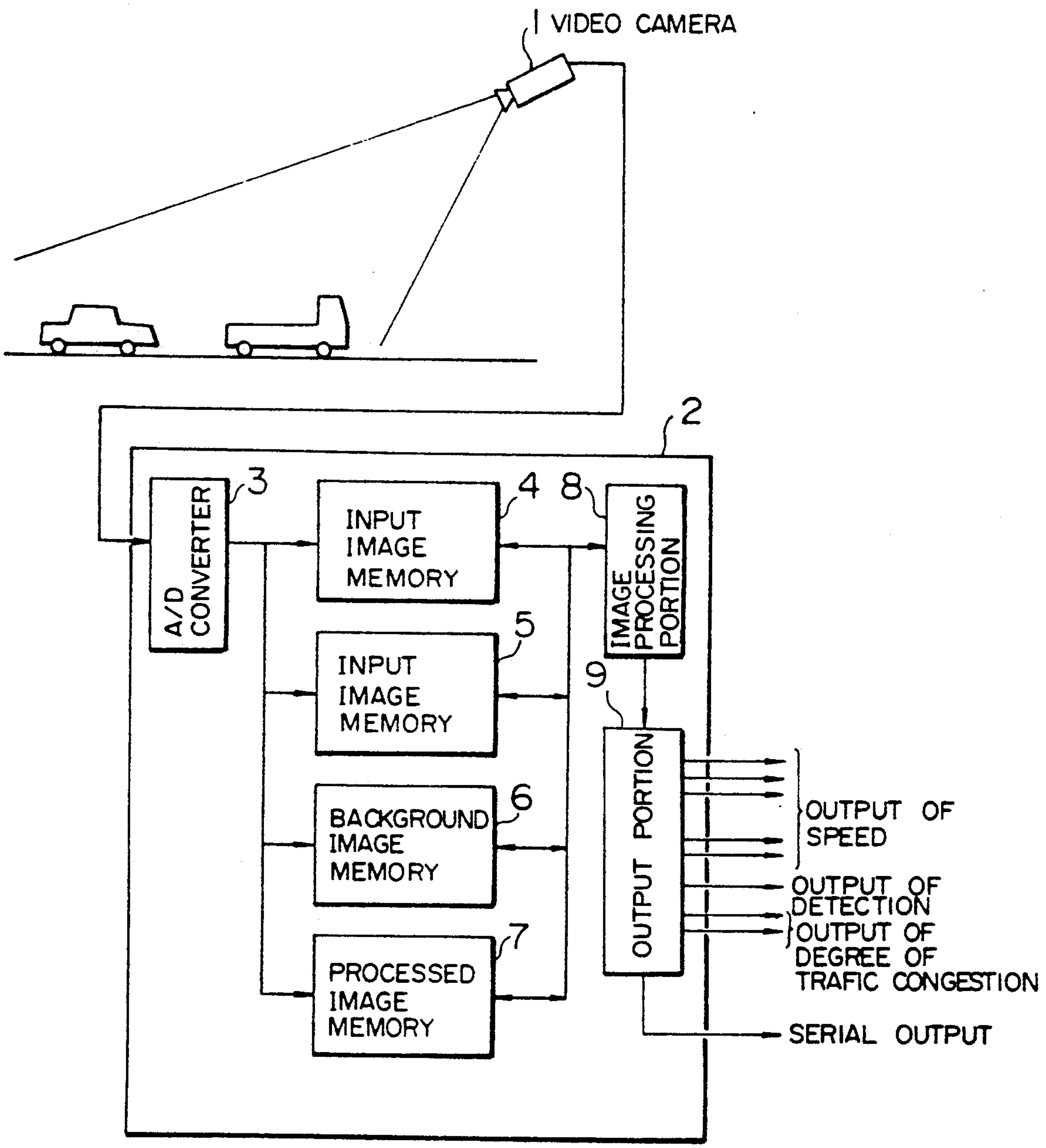
FIG. 6 is a block diagram showing the configuration of a modification of the first embodiment of the present invention.

Next, the case of providing an output portion in the traffic dynamic state measuring unit of FIG. 1 will be explained below with reference to FIG. 6. In FIG. 6, the components identified by reference numbers 1 to 8 are the same as in FIG. 1, and an output portion 9 for outputting the result of processing is added to the unit in FIG. 6. Based on the method for judging the state of the road shown in FIG. 2, the degree of the current traffic congestion is judged. The result of the measurement (speed of vehicles, whether vehicles are detected or not, degree of traffic congestion) is transmitted to a CPU, for example, by using a parallel or serial circuit through the output portion 9. Based on this information, the CPU can provide information about traffic conditions or can measure travel time, etc.

As is apparent from the above embodiment, the present invention has the following advantages.

1) Based on the state of the read (the state where no vehicle exists, the state where a running vehicle exists, or the state where a standing vehicle exists), the rate of updating the background data can be changed. In other words, the rate of updating the background data is taken to be large when no vehicle exists and the rate of updating the background data is taken to be small when a standing vehicle exists so that more accurate background data can be maintained. Further, the degree of traffic congestion can also be judged.

2) By judging whether it is day, dusk or night from the current picture data, the threshold value for image processing can be changed. Particularly, when the environment has been judged to be dusk and when there is little difference in luminance between the vehicles and the road surface in the current picture data, the threshold value in the image processing can be changed to be small based on this information.

The background data is basically stable at night. However, when a vehicle passes, the road surface may sometimes become bright with the light from the headlights of the vehicle reflected on the road surface, which affects updating of the background data. Accordingly, when the environment has been judged to be night based on the information for judging whether it is day or night, the rate of updating the background data is lowered so that an accurate updating of the background data is possible.

3) When it is judged that vehicles are standing due to traffic congestion or the like, based on information obtained by the method for judging the state of the road, the rate of updating the background data is lowered to prevent the background data from becoming disordered. When no vehicle exists, the rate of updating the background data is increased to make the background data sufficiently follow a rapid change of the environmental conditions.

Further, by changing the rate of updating the background data depending on whether it is day or night, the influence of the reflection of light from the headlights of the vehicles on the road surface at night can be minimized.

4) The background data can be updated accurately based on the information of the road so that the information of the background differential becomes accurate, which facilitates the extraction of existing vehicles. Further, by carrying out the frame differential processing, running vehicles also can be extracted easily.

5) By transmitting the information obtained in 1) above to the CPU, the CPU can utilize the information for providing information on traffic conditions or for scheduling a travelling time.

The second embodiment of the present invention will now be described with reference to the drawings.

Figure 7:
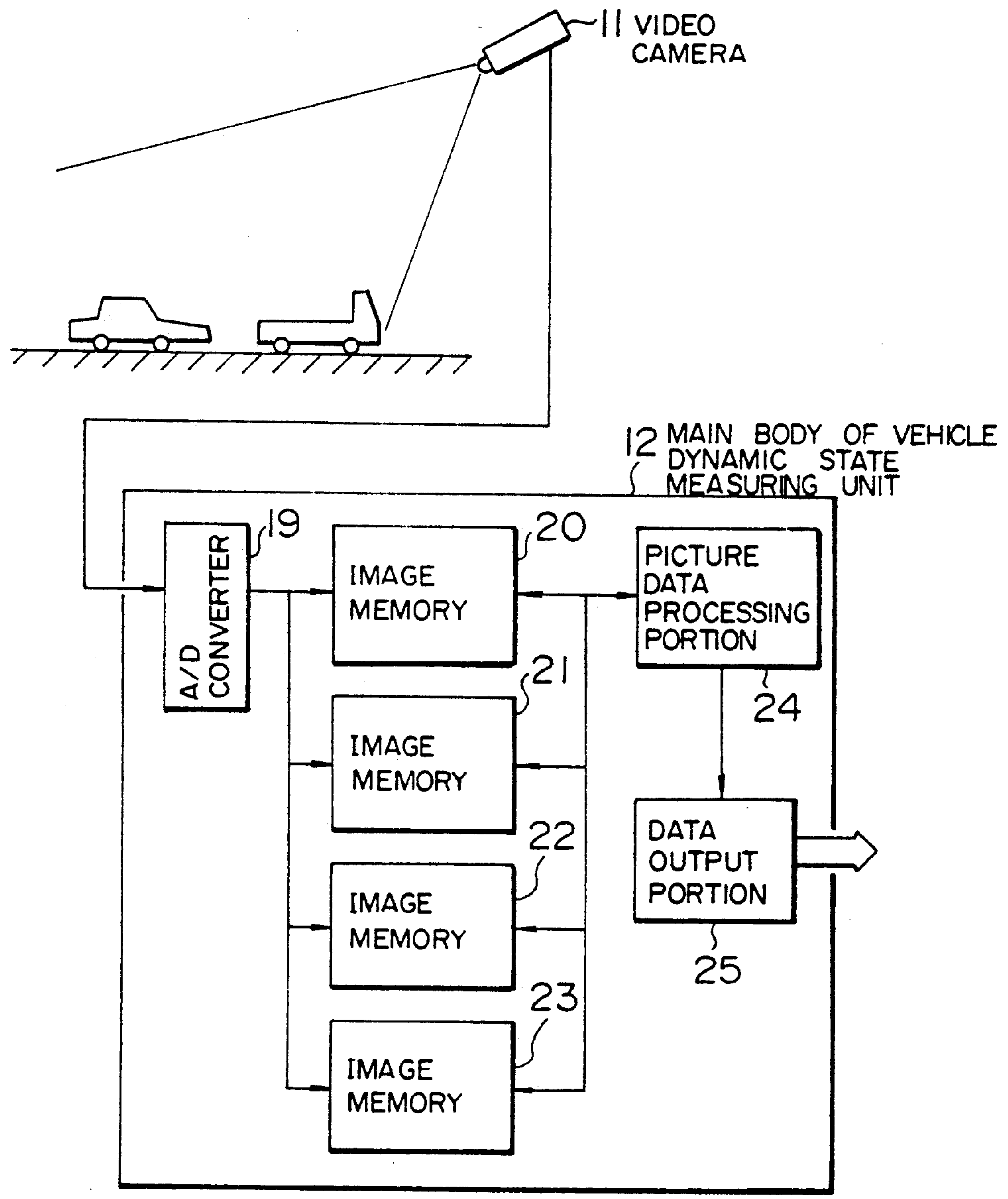
FIG. 7 is a block diagram showing the configuration of the traffic dynamic state measuring unit according a second embodiment of the present invention.

FIG. 7 shows the configuration of the second embodiment.

In FIG. 7, 11 designates a video camera and 12 designates the main body of a traffic dynamic state measuring unit.

The main body of the traffic dynamic state measuring unit 12 includes an A/D converter 19, an image memory 20 (for an input image 1), an image memory 21 (for an input image 2), an image memory 22 (for an input image 3), an image memory 23 (for an input image 4), a picture data processing portion 24 and a data output portion 25.

Next, the operation of the above-described configuration will be explained.

Picture information obtained by picking up a picture with the video camera 11 is transferred to the main body of the traffic dynamic state measuring unit 12.

The main body of the traffic dynamic state measuring unit 12 converts this information into digital data with the A/D converter 19. Digital data of two screen pictures picked up at a predetermined interval are stored in the image memories 20 and 21. Information about the state when no vehicles are on the road (background data) is stored in the image memory 22.

Based on the data stored in the image memories 20, 21 and 22, the picture data processing portion 24 uses only plus components obtained from the background differential and the frame differential with expansion processing, and writes the result of the processing in the image memory 23. The state of vehicles is then extracted from the resultant picture data. By continuously carrying out this processing, the state of the vehicles traced and the running speed of the vehicles are outputted to the data output portion 25, and at the same time, the current state of the road is judged and the background data is updated based on this information.

FIG. 8 shows the result of using only the plus components from the frame differential and background differential with expansion processing.

Figure 8A:
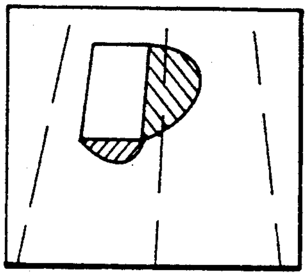
FIG. 8A is a picture data diagram of t - $\Delta t$ [sec.] according to the second embodiment of the present invention.
Figure 8B:
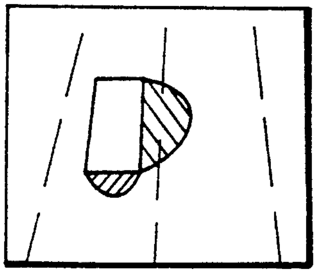
FIG. 8B is a picture data diagram of t [sec.] according to the second embodiment of the present invention.
Figure 8C:
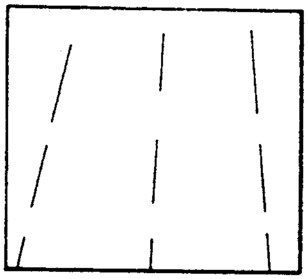
FIG. 8C is a background picture data diagram according to the embodiment of the present invention.

Three kinds of data are employed that is, picture data at t - $\Delta t$ [sec] as shown in FIG. 8A, picture data of t [sec] shown in FIG. 8B and the background data shown in FIG. 8C.

Figure 8D:
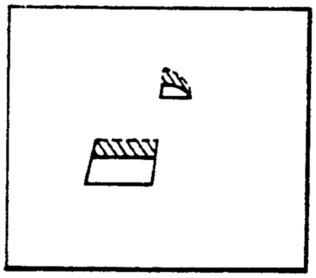
FIG. 8D is a picture data diagram showing the result of the frame differential with expansion processing of which only plus components are used according to the embodiment of the present invention.

First, the picture data at t - $\Delta t$ [sec] and t [sec] are differentiated. The result is called the frame differential. When only plus components are made valid, the front edge portion of a running vehicle and the rear portion of the side shadow of the vehicle are extracted as shown in FIG. 8D. By making the frame differentials, mobile objects can be securely extracted. Further, by carrying out expansion processing to the backward picture elements, the extraction is made more accurate. The shaded portion in FIG. 8D shows a result obtained by the expansion processing.

Figure 8E:
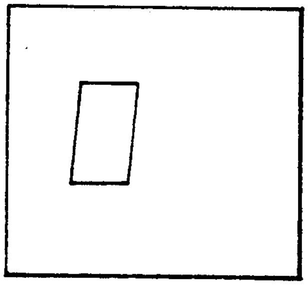
FIG. 8E is a picture data diagram showing the result of the background differential processing of which only plus components are used according to the embodiment of the present invention.

Next, the image data at t [sec] and the background data are differentiated. The result is called the background differential. When only plus components are made valid, shade portions are not extracted and only bright portions of the vehicle are extracted as shown in FIG. 8E.

Figure 8F:
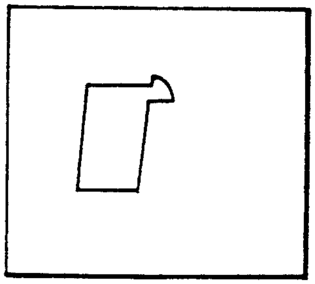
FIG. 8F is a picture data diagram showing the result of the background differential procedure plus frame differential procedure with expansion processing according to the embodiment of the present invention.

When a logical sum of the frame differential and the background differential is obtained to produce a processed screen picture, the vehicle can be securely extracted as shown in FIG. 8F. Vehicles of bright, light colors are extracted by both the frame differential technique and the background differential technique.

When vehicles have dark colors, basically the luminance of the colors becomes higher as the vehicles are approaching closer on the screen, so that the vehicles can be extracted by the frame differential technique. In the case of standing vehicles, they can not be extracted by the frame differential technique but they are extracted by the background differential technique.

The method for eliminating shades in the daytime will be explained next.

Figure 9:
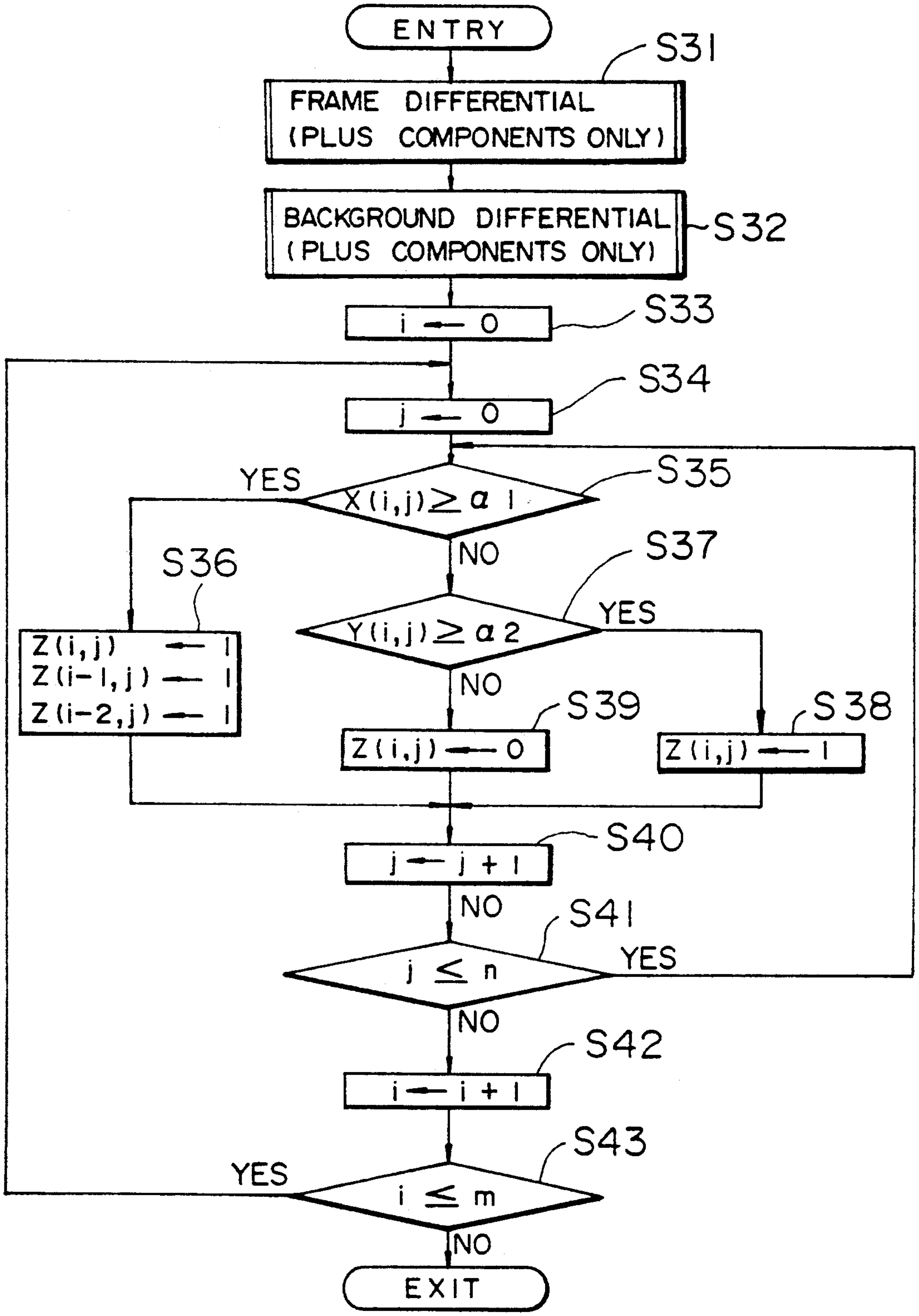
FIG. 9 is a flow chart showing the processing for producing a processed screen picture during daytime after having eliminated shadows according to the embodiment of the present invention.

FIG. 9 shows a flow chart showing the processing for producing a processed image with eliminated shadows in the daytime. First, the picture data at t [sec] and t - $\Delta t$ [sec] are differentiated (frame differential) and only plus components are made valid (step (s) 31). Then, the picture data t [sec] and the background data at are differentiated (background differential) and only plus components are made valid (Step 32).

Data of each picture element in the frame differentials is compared with a threshold value $\alpha 1$ (Step 35). When the data of each picture element is equal to or higher than the threshold value $\alpha 1$, or Yes, "1" is written in the same position of the processed screen and at the same column positions one and two rows before respectively, and thus an expansion processing (Step 36) is performed. When the data of each picture element in the frame differential is lower than the threshold value $\alpha 1$, or No, the picture data of the background differential is compared with a threshold value $\alpha 2$ (Step 37). When the picture data in the background differential is equal to or larger than the threshold value $\alpha 2$, or Yes, "1" is written in the same position of the processed screen (Step 38). In all other cases, or No, "0" is written in the same position of the processed screen (Step 39). These processings are carried out for all the picture elements to produce processed screens (Steps 33, 34, 40, 41, 42 and 43).

By using the processed screens as described above, it is possible to accurately trace the front edge position of the vehicle, without tracing the shadow of the vehicle running on the adjacent traffic lanes due to misjudging the shadow as a vehicle. Thus, accurate traffic information can be measured and collected.

Figure 10:
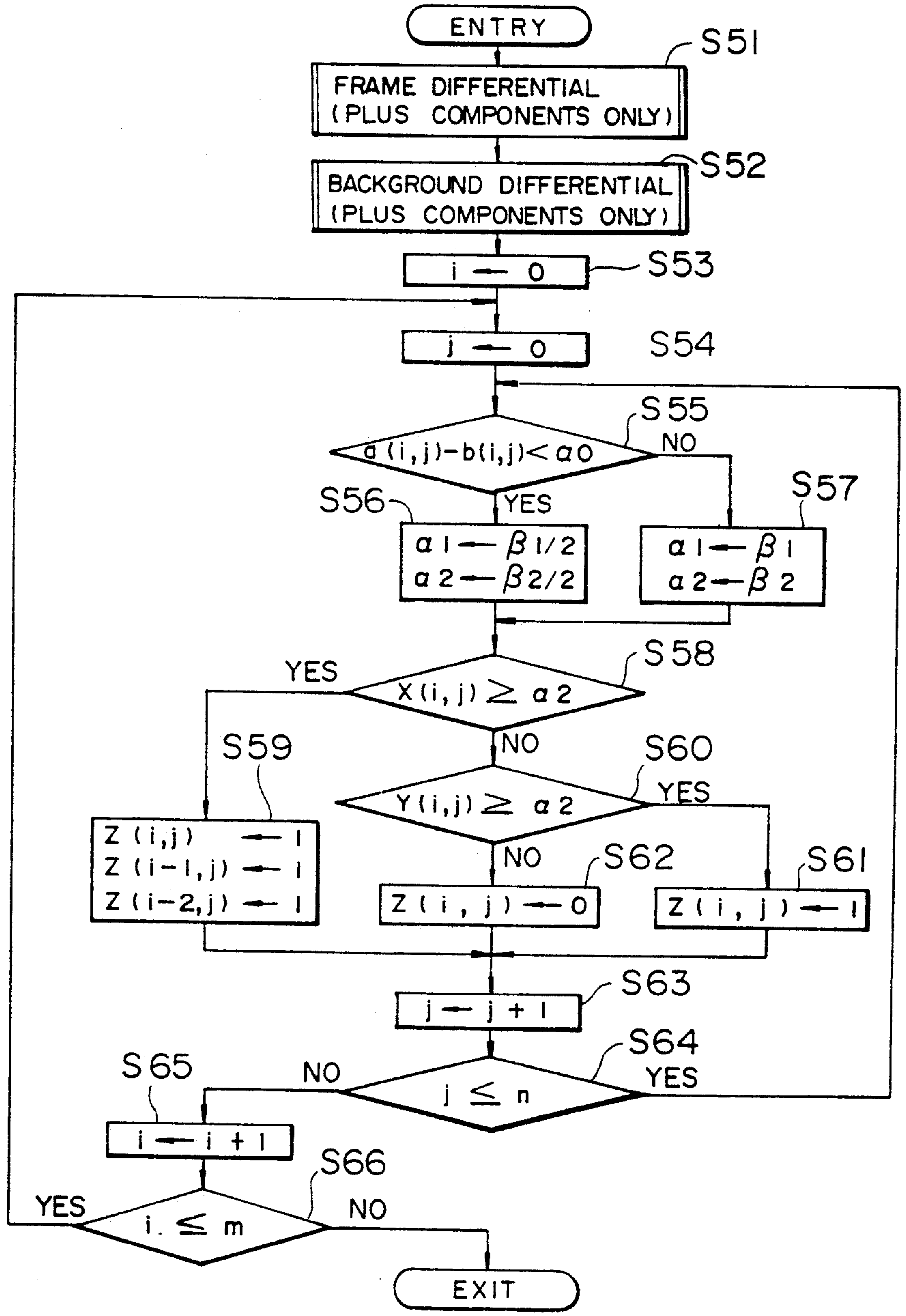
FIG. 10 is a flow chart showing the processing for producing a processed screen picture toward dusk according to the embodiment of the present invention.

FIG. 10 shows a flow chart for producing a processed screen picture at dusk.

First, the picture data at t [sec] and t - Δt [sec]] are differentiated (frame differential), and only plus components are made valid (Step 51). Then, the picture data at t [sec] and the background data are differentiated (background differential), and only plus components are made valid (Step 52). For each picture element, the picture data at t [sec] is compared with the background data (Step 55). When the differential is smaller than the threshold value, or Yes, the threshold values of the frame differential and the background differential are set to ½ of the normal threshold values (Step 56). In all other cases, or No, the normal threshold values are used (Step 57). By the above processing, vehicles having small difference of luminance can be extracted.

Then data of each picture element in the frame differential is compared with a threshold value α1 (Step 58). When the data of each picture element is equal to or larger than the threshold value α1, or Yes, "1" is written in the same position of the processed screen picture and in the positions of the same column one and two rows before respectively, and thus the expansion processing is also carried out (Step 59). When the data of each picture element in the frame difference is smaller than the threshold value α1, or No, data of each picture element in the background differential is compared with a threshold value α2 (Step 60). When the data of each picture element is equal to or larger than the threshold value α2, "1" is written in the same position of the processed screen picture (Step 61). In all other cases, "0" is written in the same position of the processed screen (Step 62). This processing is carried out for all the picture elements, to produce processed screen pictures (Steps 53, 54, 63, 64, 65 and 66).

By the above arrangement, vehicles of dark colors with small difference of luminance from the luminance of the road surface at dusk can be extracted from the processed screen picture, accurate tracing and measurement of the vehicles become possible, and accurate measuring and collecting of traffic information are enabled.

As is obvious from the above embodiment, the present invention has the following advantages.

Tracing of the front edge positions of vehicles is possible without misjudging the shadows of the vehicles in the adjacent traffic lanes as being vehicles, so that traffic information can be measured and collected accurately.

Further, tracing and measurement of vehicles is possible by extracting vehicles of dark colors with small difference of luminance from the luminance of the read surface at dusk, so that traffic information can be measured and collected accurately.

Figure 11:
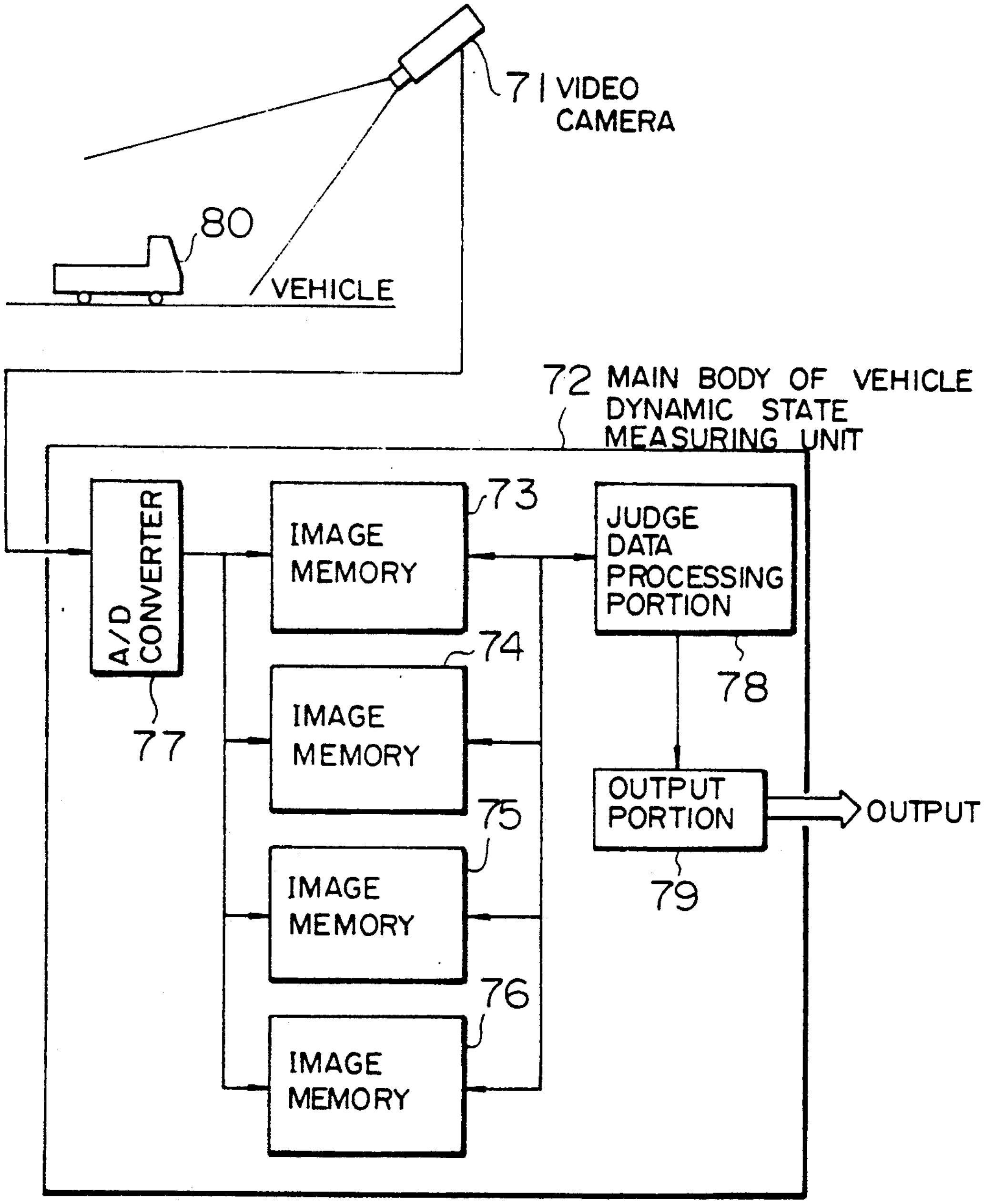
FIG. 11 is a block diagram showing the configuration of the traffic dynamic state measuring unit according to a third embodiment of the present invention.

FIG. 11 shows the configuration of the third embodiment of the present invention.

In FIG. 11, 71 designates a video camera, 72 designates a main body of a traffic dynamic state measuring unit (hereinafter to be simply referred to as a unit main body), and 73 to 76 designate image memories. Reference number 77 designates an A/D converter for picture data, 78 designates a picture data processing portion, and 79 designates a data output portion.

The operation of the above embodiment will be explained below. Picture information of a vehicle 80 picked up with the video camera 71 is transferred to the unit main body 72. The unit main body 72 converts the inputted image information into digital data by using the A/D converter 77, and stores digital data of two screen pictures picked up at a Predetermined time interval in the image memories, 73 and 74 respectively. Information about the state when no vehicle 80 is present (background data) is stored in the image memory 75.

Based on the data stored in the image memories 73, 74 and 75, the picture data processing portion, 78 carries out a background differentiation procedure and a frame differentiation procedure with expansion processing, and uses only plus components of these processings. The results of the processings are written in the image memory 76. Then the vehicle 80 is extracted from the picture data. By continuously carrying out the above processings, data indicating the movement and running speed of the vehicles are outputted from the data output portion 9 and the current state of the road can be judged. Based on this information, the background data is updated.

Figure 12:
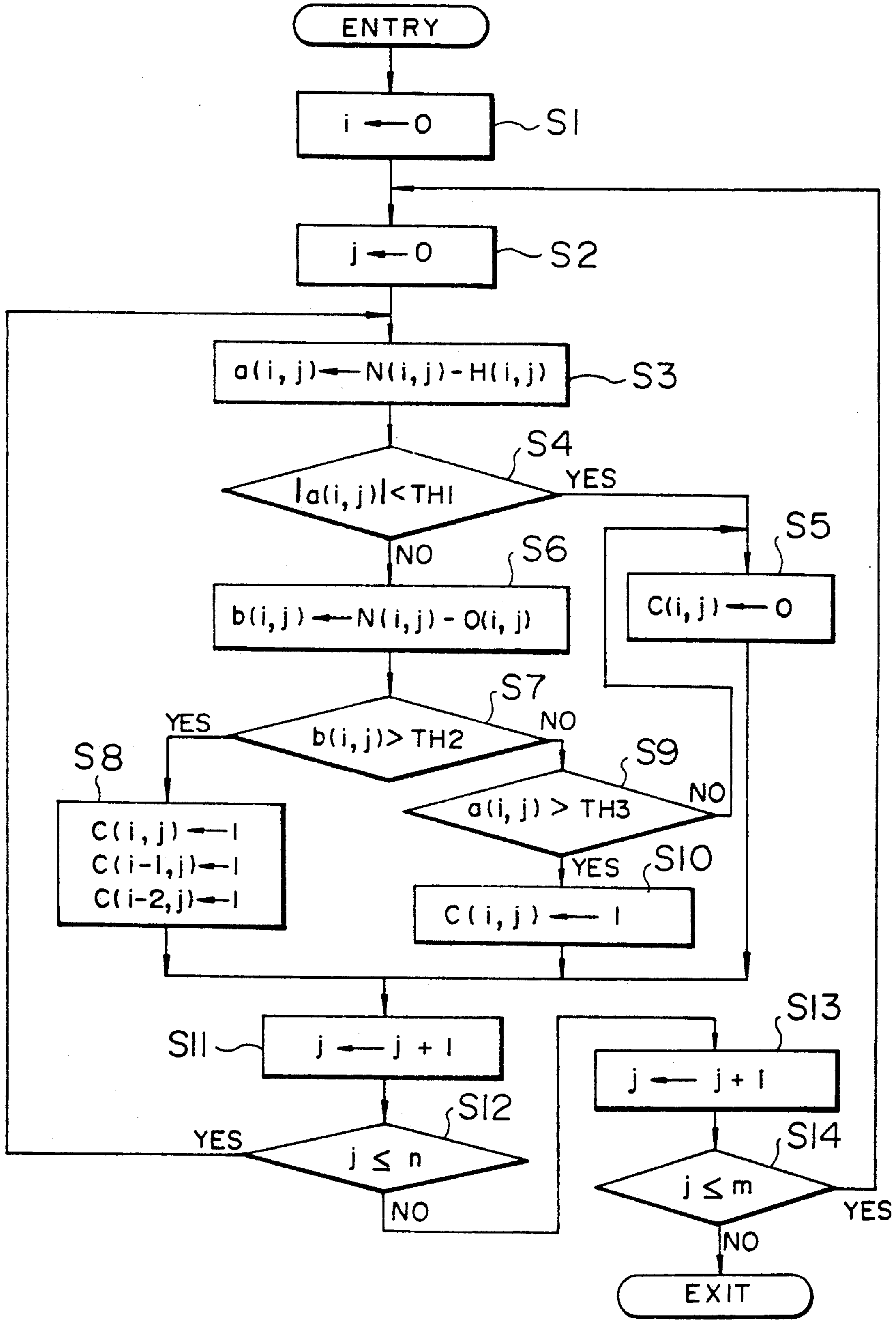
FIG. 12 is a flow chart showing a valid decision of the frame differential procedure according to the embodiment shown in FIG. 11.

FIG. 12 shows a flow chart for the basic processing of the above embodiment. The operation will be described with reference to this flow chart.

It is assumed as follows. The picture data to be processed (picture element) has a row m and a column n. The image memory data for storing a new image is N (coordinates i, j), and the image memory data for storing an old image is 0 (i, j), and the image memory data for storing background data is H (i, j). An area for storing the result of a background differential procedure is a (i, j), an area for storing the result of a frame differential procedure is (i, j), and an area for storing the result of a background differentiation procedure and a frame differentiation procedure with expansion processing is c (i, j). A threshold value for deciding whether a background differentiation procedure and a frame differentiation procedure with expansion processing should be carried out or not is TH1, a threshold value for a frame differentiation procedure with expansion processing is TH2, and a threshold value for the background differentiation procedure is TH3.

First, in Steps (hereinafter to be abbreviated as S) ($S_1$) and ($S_2$), the coordinates i and j are set to 0, and for each picture element, a background differential is taken by subtracting background picture data from new picture data and the result is stored in the area a ($S_3$). Next, a decision is made as to whether a background differentiation procedure and a frame differentiation procedure with expansion processing should be carried out for the above result, by comparing the threshold value TH1 with a (i, j) ($S_4$). If the result is smaller than the threshold value TH1, "0" is written in the area c (i, j) for storing the result of the processing ($S_5$).

If the result is equal to or larger than the threshold value TH1, a frame differential is taken by subtracting old picture data from the new picture data, and the result is stored in the area b ($S_6$). A decision is made whether the value is equal to or larger than the threshold value TH2 of the frame differential processing with expansion processing ($S_7$). If the value is equal to or larger than the threshold value TH2, "1" is written in the area c (i, j) for storing the result of the processing in the image memory 76 (FIG. 1), with expansion processing ($S_8$).

If the value is smaller than the threshold value TH2, a (i, j), which is the result of the background processing, is compared with the threshold value TH3 for the background differential ($S_9$). If a (i, j) is larger than the threshold value TH3, "1" is written in the area c (i, j) for storing the result of the processing ($S_5$). This processing is carried out for all the picture data of the row m and the column n ($S_1$, $S_2$, $S_{11}$, $S_{12}$, $S_{13}$ and $S_{14}$).

The above embodiment has an advantage in that it is possible to eliminate the rear edge portion of the shadow of a vehicle running on the adjacent traffic lanes, by judging whether the frame differential is to be made valid or not based on the result of the backward differential for each picture element. Further, it is Possible to accurately measure vehicles without being influenced by the shadows of the vehicles running on the adjacent traffic lanes.

Figure 13:
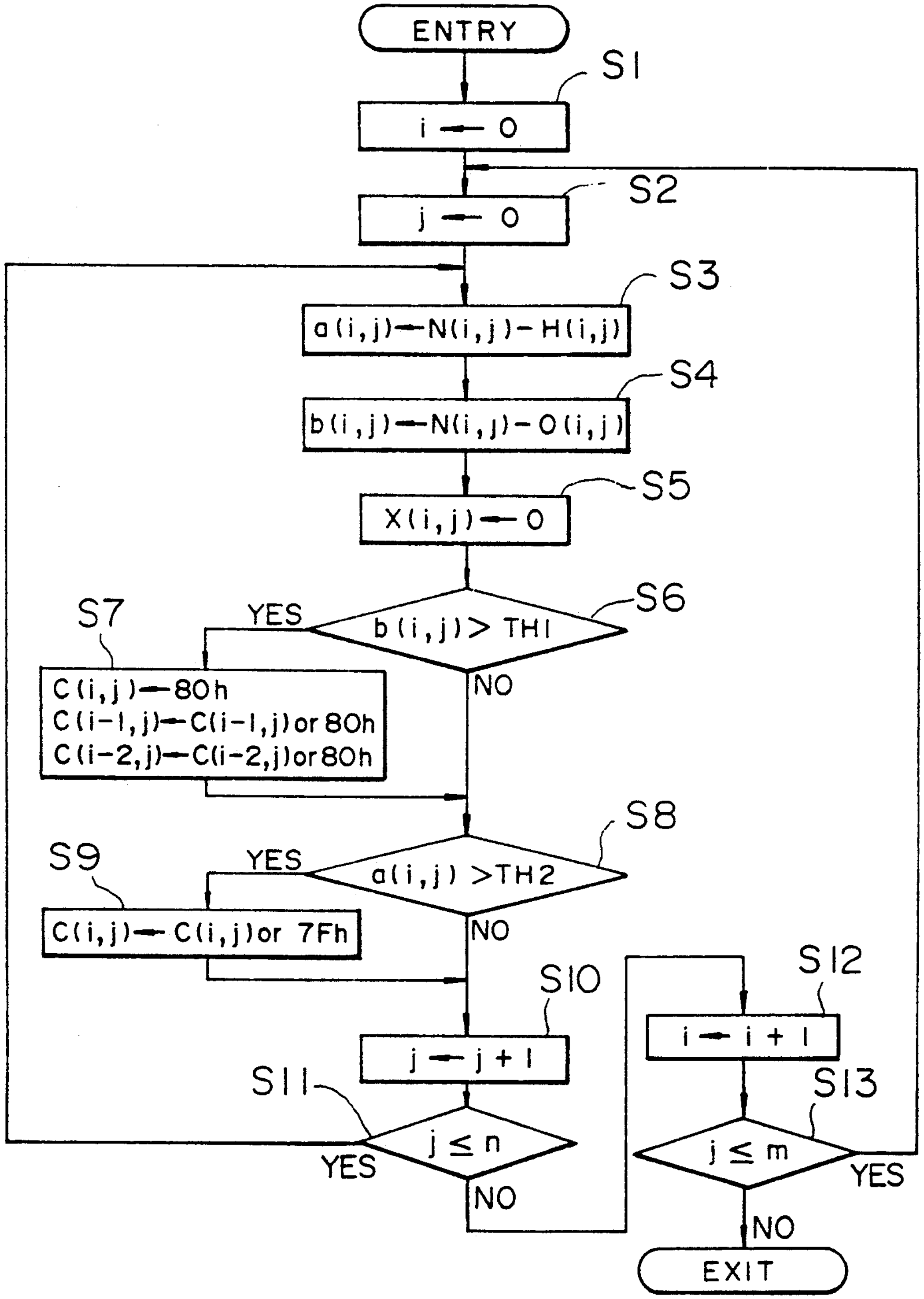
FIG. 13 is a flow chart showing the processing for producing a processed screen according to a fourth embodiment of the present invention.

FIG. 13 is a flow chart for producing a processed screen picture according to a fourth embodiment of the present invention.

It is assumed as follows. The picture data to be processed has a row m and a column n. The image memory data for storing a new image is N (i, j), the image memory data for storing an old image is 0 (i, j) and the image memory data for storing background data is H (i, j). An area for storing the result of a background differential procedure is a (i, j), an area for storing the result of a frame differentiation procedure is b (i, j), and an area for storing a processed screen picture is c (i, j). A threshold value for the processing of a frame differentiation procedure with expansion processing is TH1, and a threshold value for background differentiation procedure is TH2.

First, a background differential procedure is conducted by subtracting background picture data from new picture data, and the result is stored in the area a (i, j) ($S_3$). Next, a frame differential procedure is conducted by subtracting old picture data from the new picture data, and the result is stored in the area b (i, j) ($S_4$). Then, an area X (i, j) on the processed screen picture is cleared ($S_5$). The result of the frame differentiation procedure with a (i, j) is compared with the threshold value TH1 of the frame differentiation procedure with expansion processing ($S_6$). When the frame differential is larger than the threshold value TH1, "80h" is written in the processed screen picture, with expansion processing ($S_7$).

Next, the result of the background differentiation procedure is compared with the threshold value TH2 of the background differentiation procedure ($S_8$). When the result of the background differentiation procedure is equal to or larger than the threshold value TH2, "7Fh" is written in the processed screen picture by logical sum ($S_9$). By the above arrangement, it is possible to distinguish picture elements such that a picture element which has become valid by the background differentiation procedure is "7Fh", a picture element which has become valid by the frame differentiation procedure with expansion processing is "80h", and a picture element which has become valid both by the background differentiation procedure and the frame differentiation procedure with expansion processing is "FFh".

The above processing is carried out for all the picture data of the row m and the column n ($S_1$, $S_2$, $S_{10}$, $S_{11}$, $S_{12}$ and $S_{13}$).

As described above, according to the present embodiment, it is possible to accurately produce a processed screen picture by changing the weight of the result of the processing based on the result of the differentiation for each picture element. Thus, it is possible to extract vehicles of dark colors with small difference of luminance from the luminance of the road surface, to enable accurate tracing and measurement of vehicles, ensuring accurate measurement and collection of traffic information.

As explained above, according to the traffic dynamic state measuring unit of the present invention, it is possible to eliminate the end edge portion of the shadow of vehicles running on the adjacent traffic lanes, by deciding whether the frame differential procedure should be made valid or not based on the result of the background differential procedure for each picture element. Further, it is possible to accurately measure vehicles without being influenced by the shadow of the vehicle running on the adjacent traffic lanes. By changing the weight of the result of the processing based on the result of the differentiation for each picture element, it is possible to produce more accurately processed screen pictures, to make it possible to extract vehicles of dark colors with small difference of luminance from the luminance of the road surface, and to trace and measure the vehicles accurately, thus ensuring accurate measuring and collecting of traffic information.

We claim:

1. An apparatus for measuring the dynamic state of traffic, comprising:

video camera means for picking up images of vehicles moving on a road and producing picture data in the form of electrical signals;

an analog to digital (A/D) converter, connected to said video camera means, for converting said picture data from said video camera means into digital picture data;

input image memory means, connected to said A/D converter, for temporarily storing said digital picture data;

background data memory means, connected to said A/D converter, for storing background data indicative of the road without any vehicles on it;

image processing means, connected to said input image memory means and said background data memory means, for processing the data stored in said input image memory means and said background data memory means, said image processing means including means for judging the state of the road to determine whether a running vehicle is present and to determine whether a standing vehicle is present if a running vehicle is not present, said means for judging the state of the road including means for obtaining an average luminance value of current picture data and a most-frequent luminance value of current picture data from the digital picture data stored in said input image memory means, means for obtaining an average luminance value and a most-frequent luminance value of the background data from the background data stored in said background data memory means, means for comparing the average luminance value of the current picture data and the average luminance value of the background data, and means for comparing the most-frequent luminance value of the current picture data and the most-frequent luminance value of the background data; and output means, connected to said image processing means, for outputting the result of the judgement.

2. An apparatus for measuring the dynamic state of traffic according to claim 1, wherein said image processing means further comprises means for judging whether it is day, dusk or night based on the average luminance value of said background data and on the difference between the current picture data and the background data, and for changing a threshold value for the processing of images.

3. An apparatus for measuring the dynamic state of traffic according to claim 2, wherein said image processing means further comprises means for updating the background data based on the result of said judged state of the road and the result of said judgement about whether it is day, dusk or night.

4. An apparatus for measuring the dynamic state of traffic according to claim 1, wherein said image processing means further comprises means for conducting a background differential procedure by comparing the background data stored in said background data memory means with current picture data stored in said input image memory means and means for conducting a frame differential procedure by comparing the current picture data stored in said input image memory means with prior picture data stored in said input image memory means.

5. An apparatus for measuring the dynamic state of traffic according to claim 1, wherein said image processing means judges the degree of traffic congestion on the road based on the result of a background differential procedure in which the background data stored in said background data memory means is compared with current picture data stored in said input image memory means, the result of a frame differential procedure in which current picture data stored in said input image memory means is compared with prior picture data stored in said input image memory means, and the result of the judgement of the state of the road.

6. An apparatus for measuring the dynamic state of traffic according to claim 1, wherein said means for judging the state of the road further comprises means for determining whether a running vehicle is large or small.

7. An apparatus for measuring the dynamic state of traffic in accordance with claim 1, wherein said image processing means further comprises means for eliminating the influence of a shadow at the front end of a vehicle or a shadow of a vehicle in an adjacent traffic lane, when such shadows exist, by using only plus components obtained from a background differentiation procedure in which current picture data stored in said input image memory means is compared with the background data stored in said background data emory means, and a frame differentiation procedure with expansion processing, the frame differentiation procedure being conducted by comparing the current picture data stored in said input image memory means with prior picture data stored in said input image memory means.

8. An apparatus for measuring the dynamic state of traffic in accordance with claim 1, wherein said image processing means further comprises means for eliminating the influence of shadows by comparing picture data stored in said input image memory means with background data stored in said background data memory means when there is little difference of luminance at dusk, means for selecting a threshold value at two stages for each picture element, and means for using only plus components obtained from a background differentiation procedure in which current picture data stored in said input image memory means is compared with the background data stored in said background data memory means, and a frame differentiation procedure with expansion processing, the frame differentiation procedure being conducted by comparing the current picture data stored in said input image memory means with prior picture date stored in said input image memory means.

9. An apparatus for measuring the dynamic state of traffic in accordance with claim 1, wherein said image processing means further comprises means for conducting a background differentiation procedure in which current picture data stored in said input image memory means is compared with the background data stored in said background data memory means, means for conducting a frame differentiation procedure with expansion processing, the frame differentiation procedure being conducted by comparing the current picture data stored in said input image memory means with prior picture data stored in said input image memory means, means for producing processed screen pictures by using only plus components obtained from the result of the procedures, and means for deciding whether the result of the frame differentiation procedure with expansion processing should be made valid or not based on the result of the background differentiation procedure.

10. An apparatus for measuring the dynamic state of traffic in accordance with claim 1, wherein said image processing means further comprises means for conducting a background differentiation procedure in which current picture data stored in said input image memory means is compared with the background data stored in said background data memory means, means for conducting a frame differentiation procedure with expansion processing, the frame differentiation procedure being conducted by comparing the current picture data stored in said input image memory means with prior picture data stored in said input image memory means, means for producing processed screen pictures by using only plus components obtained from the result of the procedures, the means for producing processed screen pictures including means for changing weight for each of a picture element which has become valid by the background differentiation procedure, a picture element which has become valid by the frame differentiation procedure with expansion processing, and a picture element which has become valid by both of these procedures.

* * * * *